United States Patent
van Dijk

(10) Patent No.: US 9,958,304 B2
(45) Date of Patent: May 1, 2018

(54) MILK METER

(71) Applicant: N.V. Nederlandsche Apparatenfabriek NEDAP, Groenlo (NL)

(72) Inventor: Jeroen Martin van Dijk, Groenlo (NL)

(73) Assignee: N. V. NEDERLANDSCHE APPARATENFABRIEK NEDAP, Groenlo (NL)

( * ) Notice: Subject to any disclaimer, the term of this patent is extended or adjusted under 35 U.S.C. 154(b) by 0 days. days.

(21) Appl. No.: 15/292,221

(22) Filed: Oct. 13, 2016

(65) Prior Publication Data
US 2017/0115145 A1 Apr. 27, 2017

(30) Foreign Application Priority Data
Oct. 15, 2015 (NL) ..................................... 2015620

(51) Int. Cl.
*G01F 1/52* (2006.01)
*A01J 5/01* (2006.01)
*G01F 1/00* (2006.01)

(52) U.S. Cl.
CPC ........ *G01F 1/52* (2013.01); *A01J 5/01* (2013.01); *G01F 1/007* (2013.01)

(58) Field of Classification Search
CPC ................ G01F 1/52; G01F 1/007; A01J 5/01
USPC ............ 73/861.28, 861.27, 224, 218, 861.05
See application file for complete search history.

(56) References Cited

U.S. PATENT DOCUMENTS

| | | | | |
|---|---|---|---|---|
| 4,112,758 A * | 9/1978 | Heidecker | ................. | A01J 5/01 73/218 |
| 4,306,454 A * | 12/1981 | Olrik | ........................ | A01J 5/01 73/224 |
| 4,485,762 A * | 12/1984 | Sutton | ..................... | G01F 15/08 119/14.17 |
| 4,934,191 A * | 6/1990 | Kroening | ............ | G01F 23/2965 376/258 |
| 5,080,040 A * | 1/1992 | van der Lely | .......... | A01J 5/007 119/14.09 |
| 8,671,883 B2 * | 3/2014 | Umegard | ................ | A01J 5/007 119/14.02 |
| 9,784,603 B2 * | 10/2017 | Xie | ......................... | G01F 1/588 |
| 2016/0258793 A1 * | 9/2016 | Li | ............................. | G01F 1/58 |

FOREIGN PATENT DOCUMENTS

| | | |
|---|---|---|
| WO | 2004/042329 A1 | 5/2004 |
| WO | 2006/135301 A1 | 12/2006 |

OTHER PUBLICATIONS

Dutch Search Report, dated Jun. 15, 2016 (2 pages).

* cited by examiner

*Primary Examiner* — Jewel V Dowtin
(74) *Attorney, Agent, or Firm* — Jacobson Holman, PLLC.

(57) ABSTRACT

Milk meter for measuring a flow rate of a milk flow, provided with an inlet, an outlet, and a liquid flow path from the inlet to the outlet. The milk meter has a measuring chamber and a float in the measuring chamber configured to float on milk. The milk meter determines the flow rate from the level of milk and the milk meter is provided with a magnetic unit for generating a magnetic field and the magnetic field varies in height direction of the measuring chamber, and the float has an electronic measuring unit for measuring the strength of the magnetic field. The measured strength of the magnetic field is a measure of the height at which the float is floating on the milk and the measured strength of the magnetic field is a measure of the flow rate of the milk flow.

20 Claims, 5 Drawing Sheets

MILK METER

BACKGROUND OF THE INVENTION

The invention relates to a milk meter for measuring a flow rate of a milk flow, provided with an inlet to which, in use, the milk flow is supplied, an outlet where the milk flow leaves the milk meter, in use, and a liquid flow path extending from the inlet to the outlet.

Such milk meters, of diverse types, are known. Many known milk meters are mechanical fill and dump meters, which contain moving parts. A drawback of such mechanical milk meters is that the moving parts are subject to wear and require maintenance, and further are susceptible to pollution. The invention contemplates the provision of a milk meter that contains an improvement over known milk meters.

CROSS-REFERENCE TO RELATED APPLICATIONS

"Not Applicable"

STATEMENT REGARDING FEDERALLY SPONSORED RESEARCH OR DEVELOPMENT

"Not Applicable"

THE NAMES OF THE PARTIES TO A JOINT RESEARCH AGREEMENT

"Not Applicable"

STATEMENT REGARDING PRIOR DISCLOSURES BY THE INVENTOR OR A JOINT INVENTOR

"Not Applicable"

BRIEF SUMMARY OF THE INVENTION

The milk meter according to the invention is characterized in that the milk meter is provided with a measuring chamber which is included in the liquid flow path and a float which is in the measuring chamber and is configured to float on milk of the milk flow that is in the measuring chamber, wherein the milk meter is configured such that a level of milk in the measuring chamber depends on the flow rate of the milk flow, wherein in the float an electronic measuring unit is arranged for contactlessly measuring the height within the measuring chamber at which the float is floating on the milk in the measuring chamber so that the measured height is a measure of the flow rate of the milk flow, and wherein the electronic measuring unit is provided with a transmitter unit for wirelessly emitting a signal which comprises information about the measured flow rate of the milk flow.

An advantage of the milk meter according to the invention is that the moving float is not subject to wear because measuring is done contactlessly and the obtained information about the flow rate is emitted wirelessly. The ability to transmit information about the measured flow rate wirelessly moreover provides the advantage that a lot of cable can be saved. In large cow houses this can easily run up to kilometers of cable. This is because an udder of the cow has to be freely accessible, which is why cables are mostly diverted along a direction of a path along which the cows walk in the milking parlor, so that the cows cannot come into contact with the cables. A further disadvantage of the use of cables is that they are typically provided with connectors which are sensitive to moisture. Especially a milking parlor is particularly moist. This makes it particularly advantageous when the electronic measuring unit is provided with a transmitter unit as has been indicated above.

A further advantage is that the vulnerable electronic measuring unit is included in the float, and hence can be well protected from contamination and other interactions with, for example, objects from outside of the milk meter. Moreover, it appears that in this manner the flow rate of the milk flow can be determined very accurately. A reason for this is that the float lowers through foam floating on the milk. As a result, a measurement is performed where the foam does not introduce any inaccuracy in the measurement. As the electronic measuring unit is in the float, the weight of a float can be kept small. Consequently, the float itself can also be kept small. In particular, it holds that the milk meter is furthermore provided with a magnetic unit for generating a magnetic field in the measuring chamber such that the magnetic field varies in a height direction of the measuring chamber, wherein the electronic measuring unit is configured for measuring the strength of the magnetic field, wherein the measured magnetic field strength of the magnetic field is a measure of the height within the measuring chamber at which the float is floating on the milk in the measuring chamber and whereby hence the measured field strength of the magnetic field is a measure of the flow rate of the milk flow. In this manner, the height at which the float is in the measuring chamber can be accurately measured. In particular, it holds that a magnetic unit is provided with a permanent magnet. The permanent magnet has as an advantage that it is also insensitive to the environment of the milking parlor. As it has been chosen to arrange the electronic measuring unit in the float, instead of the permanent magnet, the float, as mentioned, can be kept light and hence relatively small. Moreover, this way the magnet can be of relatively large design. A large magnet provides that with the aid of the electronic measuring unit measuring can be done in a low-energy manner. Moreover, no, or hardly any, disturbance due to external magnetic fields or even the geomagnetic field occurs. The float can be of exchangeable design so that the electronics can be easily upgraded. In particular, it holds that the electronic measuring unit is provided with a supply. While, as mentioned, the electronic measuring unit can work in a low-energy manner, in this way the float can still be simply replaced when the supply is empty.

In particular, it holds that the electronic measuring unit is furthermore provided with a sensor such as a Hall sensor or a fluxgate sensor for detecting the magnetic field and a processor for processing measuring signals from the Hall sensor to obtain information about the flow rate of the milk flow.

According to a practical variant, it follows that the measuring chamber is provided with a first outlet opening which is in fluid communication with the outlet so that, in use, milk can flow out of the measuring chamber to the outlet, the outlet opening being preferably provided in a bottom of the measuring chamber.

More particularly, it holds according to a preferred embodiment that the milk meter is provided with a buffer reservoir which is included upstream of the measuring chamber in the liquid flow path, while in a sidewall of the buffer reservoir an outflow opening is provided which extends from a lowest point of the outflow opening upwardly and which is in fluid communication with the outlet, while a top of the buffer reservoir comprises an inlet opening which is in fluid communication with the inlet, and wherein the buffer reservoir and the measuring chamber are connected with each other via a fluid communication connection, briefly: fluid connection, such that the buffer reservoir, fluid connection and measuring chamber, in use, function as communicating vessels so that, in use, a level of the milk in the measuring chamber is equal to a level of the milk in the buffer reservoir. It appears that in this manner a very reliable measurement can be performed which works well with both relatively high flow rates and relatively low flow rates.

In particular, it holds here that the outflow opening of the buffer reservoir has a width that increases in upward direction. This has as a consequence that with an increasing flow rate the milk flow through the outflow opening can easily increase so that a proper division can be obtained between on the one hand a level of the milk in the buffer reservoir and on the other hand the flow rate of the milk flow.

According to a practical embodiment, it holds that the outflow opening is in fluid communication with the outlet via a bypass channel.

In particular, it holds here that the measuring chamber is of cylinder-shaped design, and with the buffer reservoir extending around the measuring chamber. In this manner, a compact milk meter can be realized.

According to a preferred embodiment, it further holds that a bottom of the buffer reservoir and a bottom of the fluid connection are at a same height as a bottom of the measuring chamber. The milk flow being distributed by a plate leads to a quiet depositing of the milk flow in the buffer reservoir. This provides the advantage that a stable milk surface is obtained with little "undulation". This in turn provides the advantage that bobbing of the float is counteracted. In particular, the measuring chamber 6, the buffer reservoir 24, the bypass channel 32 and the fluid connection 36 are of a non-magnetizable material such as plastic or aluminum.

BRIEF DESCRIPTION OF THE SEVERAL VIEWS OF THE DRAWING(S)

The invention will presently be further elucidated on the basis of the drawing, in which.

DETAILED DESCRIPTION OF THE INVENTION

Figure 1:
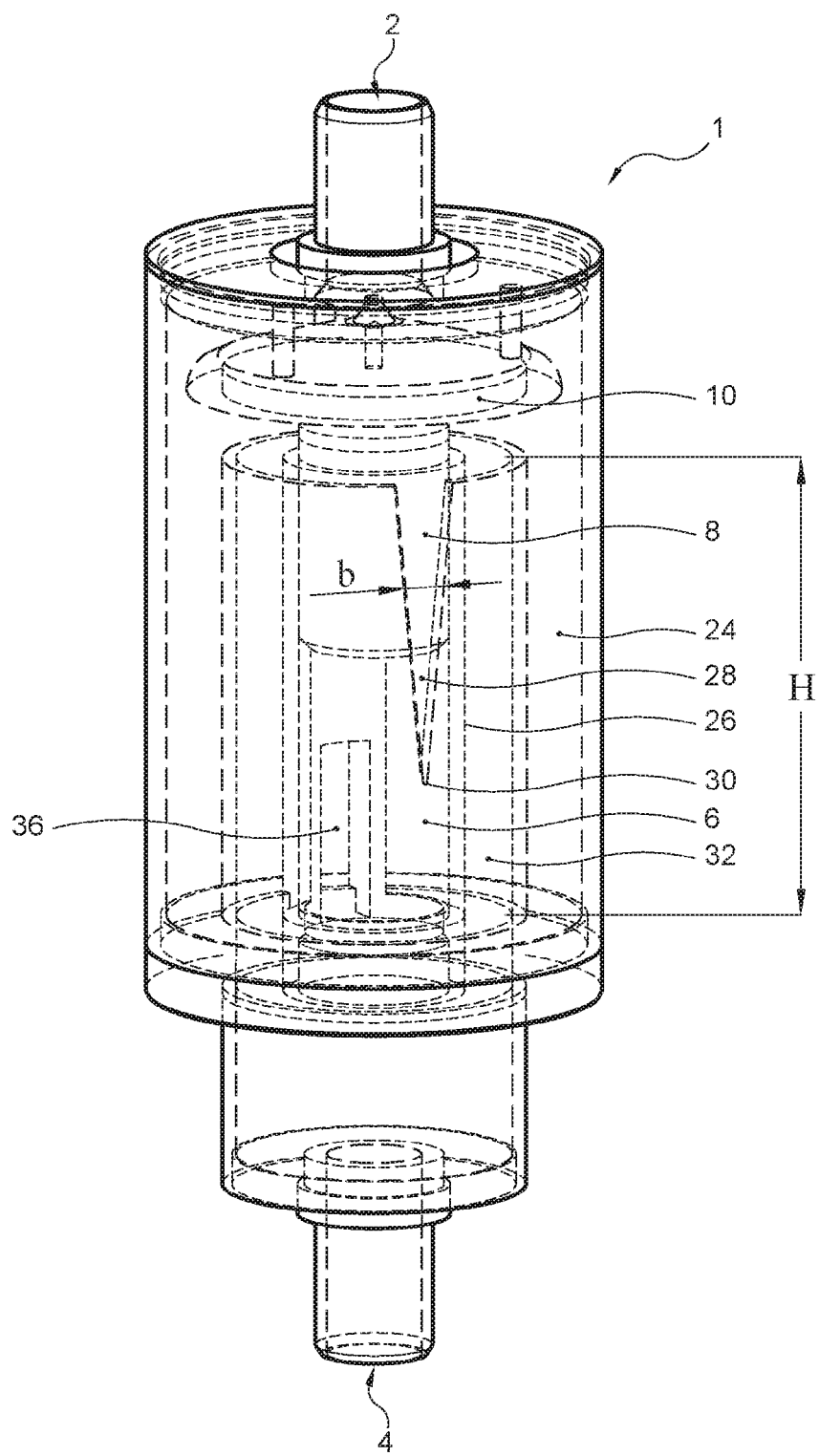
FIG. 1 shows a transparent view of a possible embodiment of the milk meter according to the invention.

In FIG. 1, with reference numeral 1 a possible embodiment of a milk meter according to the invention is indicated. The milk meter is provided with an inlet 2 into which, in use, the milk flow whose flow rate is to be measured is supplied. Further, the milk meter is provided with an outlet 4 where the milk flow whose flow rate has been measured, in use, leaves the milk meter again. Between the inlet and the outlet extends a liquid flow path 5 which is schematically indicated in the drawing with a broken line. Obviously, the broken line concerns just one possible pathway along which the milk flow can proceed; reason why the representation is schematic.

The milk meter is provided with a measuring chamber 6 which is included in the liquid flow path 5. The milk meter is furthermore provided with a float 8 which is in the measuring chamber and which is configured to float on the milk of the milk flow that, in use, is in the measuring chamber. The milk meter is configured such that a level of the milk in the measuring chamber (the height of the liquid surface of the milk in the measuring chamber) depends on the flow rate of the milk flow. In this example, it holds that the height of the level of the milk in the measuring chamber increases when the flow rate increases.

The milk meter is further provided with a magnetization unit 10 for generating a magnetic field in the measuring chamber. The magnetic field that is generated is such that the magnetic field strength varies in a height direction h of the measuring chamber. In the float, an electronic measuring unit 12 is arranged for measuring the strength of the magnetic field. The strength of the magnetic field is also referred to as a magnetic flux. The measured strength of the magnetic field is a measure of the height at which the float is floating on the milk in the measuring chamber. Because the height at which the float is floating within the measuring chamber, in turn, is determined by the flow rate of the milk flow, in this way information about the flow rate is obtained. To put it differently, the flow rate is measured in this manner.

Figure 3:
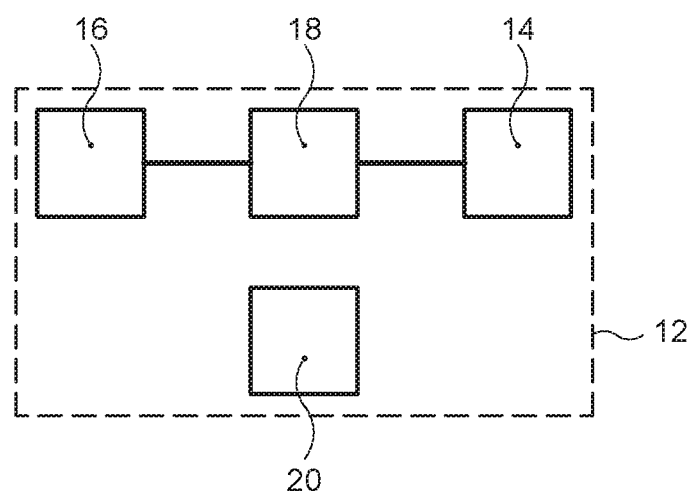
FIG. 3 shows a possible embodiment of the measuring unit of the milk meter of FIG. 2.

As can be seen in FIG. 3, the electronic measuring unit is provided with a transmitter unit 14 for emitting a signal which comprises information about the measured flow rate of the milk flow. The electronic measuring unit is further provided with a Hall sensor 16 for detecting the magnetic field and a processor 18 for processing measuring signals from the Hail sensor to obtain information about the flow rate of the milk flow, which is emitted with the aid of the transmitter unit 14. The electronic measuring unit 12 is further provided with a supply 20 for providing a supply voltage for the processor and the transmitter unit.

The milk meter in this example is further provided with a buffer reservoir 24 which is included upstream of the measuring chamber in the liquid flow path 5. Provided in a sidewall 26 of the buffer reservoir is an outflow opening which extends from a lowest point 30 of the outflow opening upwardly in the direction h and which is in fluid communication with the outlet 4. In this example, it holds that the outflow opening 28 is in fluid communication with the outlet 4 via a bypass channel 32. A top of the buffer reservoir is provided with an inlet opening 34 which is in fluid communication with the inlet 2. The buffer reservoir 24 and the measuring chamber 6 are connected with each other via a fluid connection 36. The construction is such that the buffer reservoir 24, the fluid connection 36 and the measuring chamber 6, in use, function as communicating vessels so that, in use, a level of the milk in the measuring chamber (measured in the direction h) is equal to a level of the milk in the buffer reservoir (likewise measured in the direction h).

In this example, it holds that a bottom 38 of the buffer reservoir, and a bottom 40 of the fluid connection 36 are at the same height as a bottom 42 of the measuring chamber. The buffer reservoir and the measuring chamber are directly or indirectly open to an environment formed in a milking system for milking animals in which the milk meter is included, for instance via small apertures at a top of the buffer reservoir and the measuring chamber (not shown). This environment of the system typically has a somewhat reduced pressure relative to the atmospheric pressure. This has as a consequence that the buffer reservoir, the measuring chamber and the fluid connection function as communicating vessels, the vessels being formed by the buffer reservoir and the measuring chamber. Clearly, in a different application, the buffer reservoir and the measuring chamber may also communicate with an environment outside the milking system and hence with the space in a barn. As can be seen in FIG. 1, it holds that the outflow opening 28 of the buffer reservoir has a width b which increases in upward direction (in the direction h). The lowest point 30 of the outflow opening is below a half height H of the measuring chamber. This is merely an example. This point may, if desired, be higher or lower and the point 30 may even be on the bottom 38 of the buffer reservoir.

Figure 2:
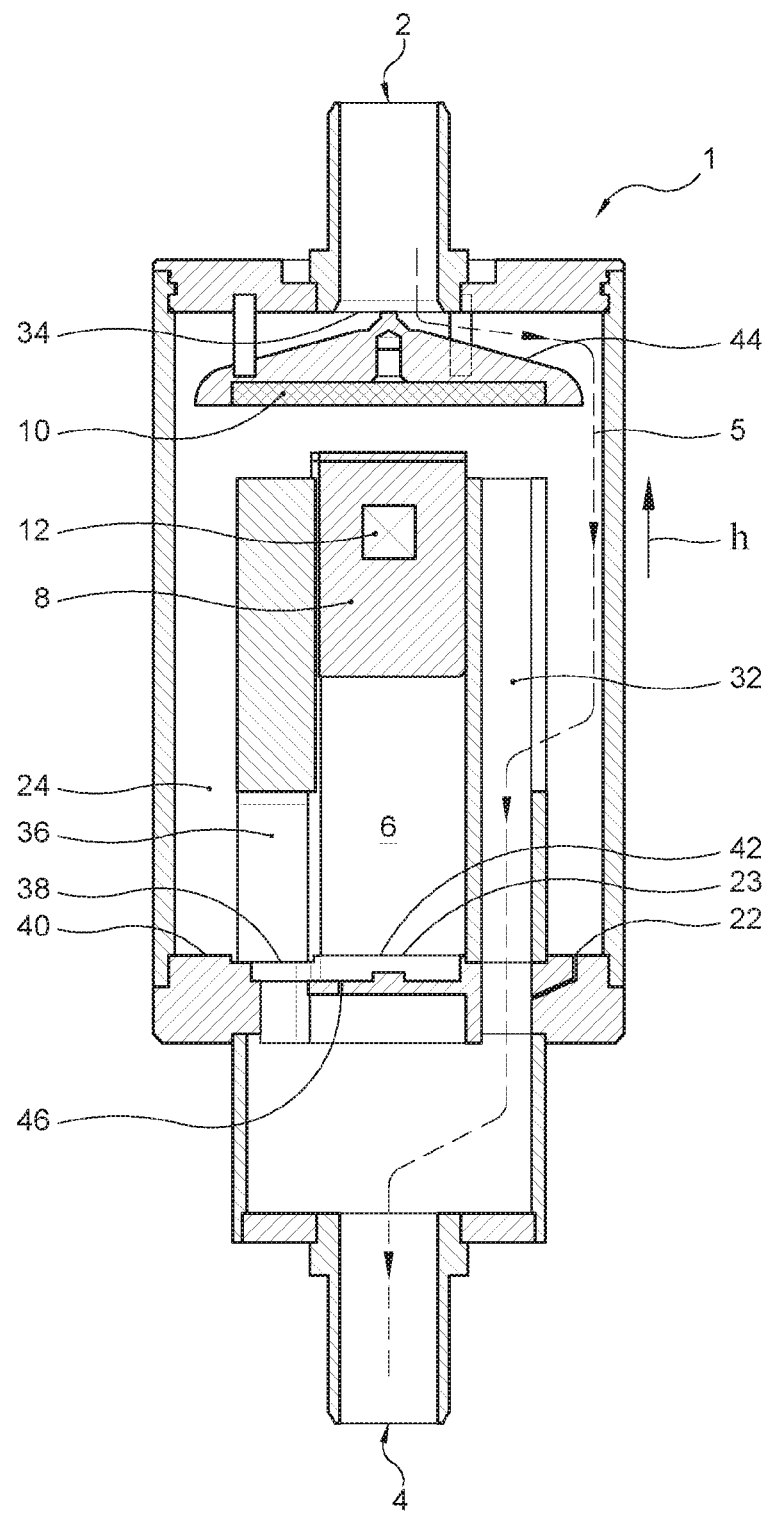
FIG. 2 shows a cross section of the milk meter along the line H,h in FIG. 1.

As can be seen in FIG. 2, it holds that the measuring chamber 6 in this example is of cylinder-shaped design, with the buffer reservoir extending around the measuring chamber. More particularly, it holds that the bypass channel 32 extends around the measuring chamber 6, and the buffer reservoir 24 extends around the bypass channel. The bypass channel and the buffer reservoir are hence of tubular design. The milk meter is furthermore provided with a milk flow spread plate 44 which is arranged in the liquid flow path 5 between the inlet and the buffer reservoir and is positioned such that the milk flow is distributed by the plate. The remagnetization unit is implemented as a permanent magnet which in this example is arranged above the measuring chamber; more specifically, in this example under the spread plate 44.

The operation of the milk meter is as follows. When a liquid flow is supplied to the inlet 2, it will first come into contact with the spread plate 44. The milk then flows over the edges of the spread plate into the buffer reservoir 24. This buffer reservoir 24 will start to fill. The measuring chamber is likewise filled with the milk via the fluid connection 36. The arrangement is such that the level of the milk in the buffer reservoir and in the measuring chamber is the same. When the level of the milk in the buffer reservoir rises further, the level of the milk will reach the lowest point 30 of the outflow opening 28. As soon as the milk level gets higher, the buffer reservoir will start to empty via the outflow opening 28. During measurement, the level of the milk is thus equal to, or higher than, the lowest point 30. The height of the lowest point 30 is chosen such that during measurement the float will always float properly. The milk flowing out via the outflow opening 28 will flow via the bypass channel 32 to the outlet 4. When the milk level in the milk meter rises further, a larger portion of the outflow opening 28 will be below the milk level. As a result, the magnitude of the flow rate of the milk that flows through the outflow opening 28 will increase. Eventually, an equilibrium will be established between the supply of milk to the buffer reservoir and the amount of milk that leaves the buffer reservoir. This equilibrium is then also associated with a particular height of the level of the milk in the buffer reservoir. This equilibrium and hence the height of the liquid surface of the milk (here also called the level) depends on the magnitude of the flow rate at which the milk is being supplied to the inlet 2. When the flow rate of the milk that is supplied to the inlet 2 increases, there will be a short period of time in which the flow rate through the outflow opening 28 is smaller than the flow rate of the milk through the inlet. The result is that the milk level in the buffer reservoir will rise. The result of this is that the flow rate through the outflow opening 28 will increase (because a larger part of the outflow opening is below the milk level) until an equilibrium is established again between supply and discharge of milk in the buffer reservoir. When the flow rate of the milk that is supplied to the inlet 2 decreases, there will be a short period of time in which the flow rate of the milk that flows through the outflow opening 28 is greater than the flow rate of the milk that flows through the inlet. The consequence is that the milk level in the buffer reservoir will fall, as a result of which the flow rate through the outflow opening will decrease (in that a smaller part of the outflow opening is below the level of the milk (the milk surface) in the buffer reservoir) until an equilibrium is established again between supply and discharge of milk in the buffer reservoir. The milk level in the measuring chamber (the height of the liquid surface of the milk in the measuring chamber) will follow the milk level of the buffer reservoir. The measured strength of the magnetic field will hence be a measure of the height at which the float is floating on the milk in the measuring chamber. Because the height at which the float is floating within the measuring chamber, in turn, is determined by the flow rate of the milk flow, in this manner information about the flow rate is obtained. To put it differently, the flow rate is measured in this manner.

In particular, the buffer reservoir and the measuring chamber are each further provided with a relatively small outlet opening 22 and 46 which have no influence on the measurement because through these openings only a relatively small portion of the milk can flow out of the buffer reservoir and the measuring chamber, respectively. These openings, so-called drainage openings, are provided to ensure that after use the measuring chamber and the buffer reservoir can slowly empty via the outlet 4. The float is of exchangeable design, so that it can be replaced when the supply is empty or when the electronics is to be updated.

Figure 4:
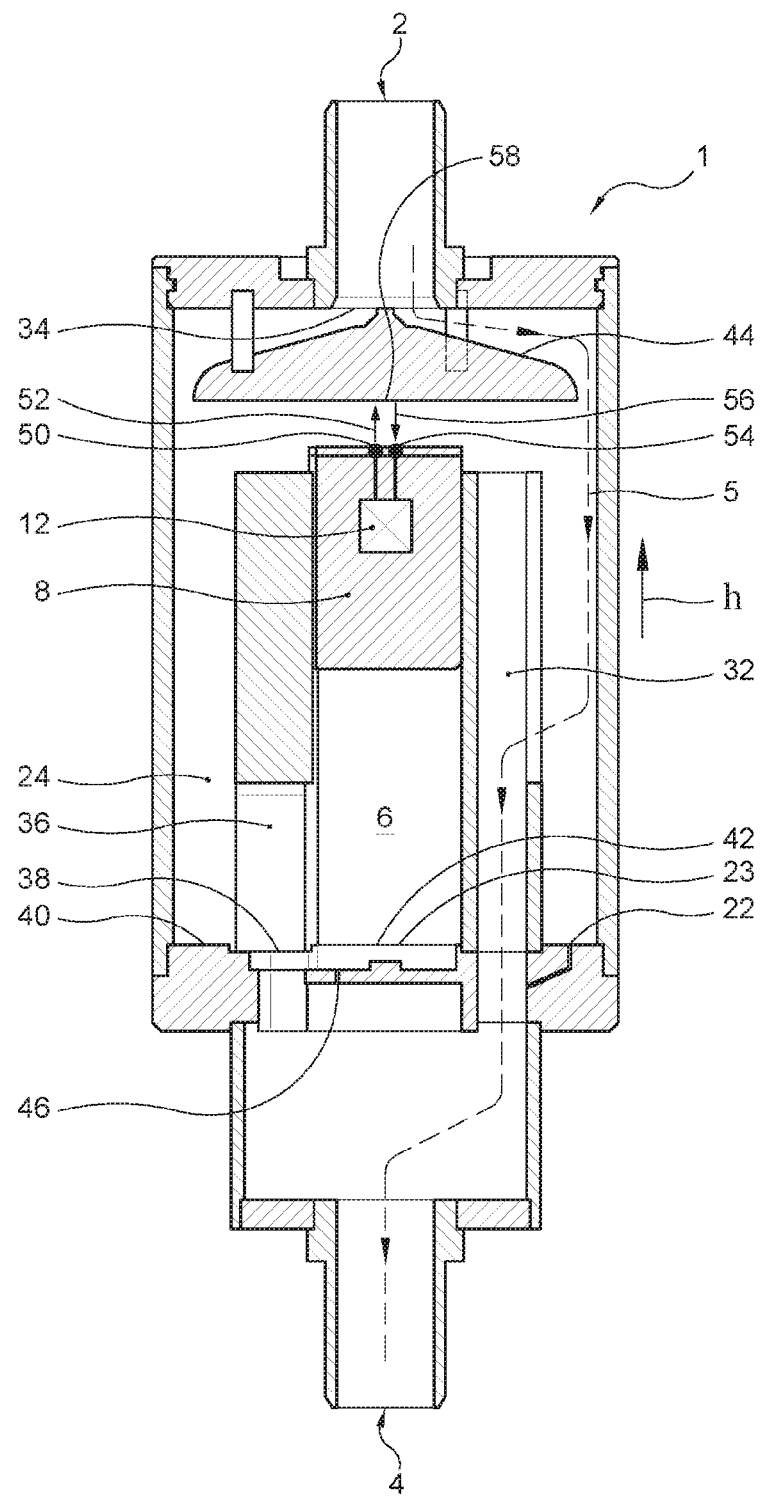
FIG. 4 shows a cross section of an alternative embodiment of a milk meter according to the invention.
Figure 5:
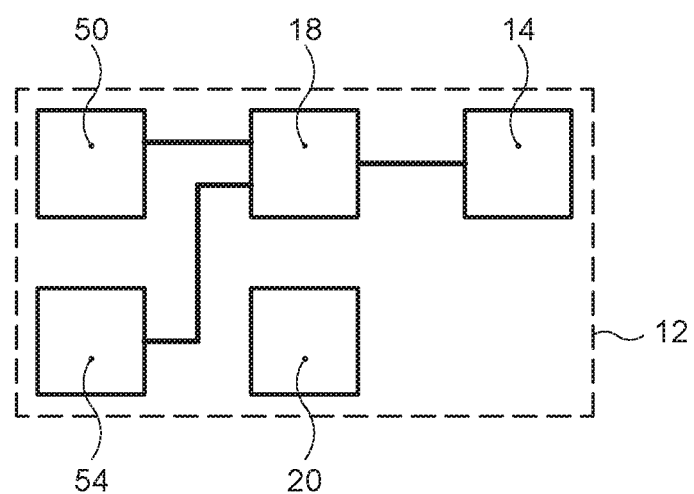
FIG. 5 shows a possible embodiment of the measuring unit of the milk meter of FIG. 4.

The invention is not in any way limited to the above-outlined embodiment. For instance, it is not necessary that the measuring chamber, the buffer reservoir and the bypass are arranged coaxially. They can also be chambers that are positioned next to each other. Also, the measuring chamber may for instance have the shape of a rectangular bar instead of a cylinder. The float can then likewise be of rectangular design. In this example, the measuring chamber 6, the buffer reservoir 24, the bypass channel 32 and the fluid connection 36 are of a plastic. This provides the advantage that these parts do not influence the magnetic field. Also, the electronic measuring unit may be provided with other means than described above for contactlessly measuring the height within the measuring chamber at which the float is floating on the milk in the measuring chamber so that the measured height is a measure of the flow rate of the milk flow. Such a variant is shown in FIGS. 4 and 5, where parts corresponding to FIGS. 2 and 3 are provided with the same reference numerals. The electronic measuring unit 12 is provided with a transmitter 50 for emitting up in an upward direction a pulsating electromagnetic or acoustic measuring signal 52, a receiver 54 for receiving reflections 56 of the measuring signal on a part 58 of the milk meter that is fixed relative to the measuring chamber. The processor 18 is configured to determine the time difference between the emission and reception of a pulse of the measuring signal, whereby the time difference is a measure of the height within the measuring chamber at which the float is floating on the milk in the measuring chamber and whereby hence the measured time lapse is a measure of the flow rate of the milk flow. With the aid of the transmitter unit 14 again information about the flow rate of the milk flow is emitted. Other variants are also conceivable. For instance, an inner wall of the measuring chamber may be provided with optical, mutually different markings which are separated from each other in upward direction. With an optical sensor of the measuring unit 12 which has a horizontal viewing direction, in each case, depending on the height at which the float is in the measuring chamber, at least one defined marking can be detected. By determining which marking or markings are detected with the sensor, the height at which the float is within the measuring chamber can be determined. The detected height is then a measure of the flow rate of the milk flow. Information about the flow rate of the milk flow can again be emitted with the transmitter unit 14. Such variants are each understood to fall within the framework of the invention.

The invention claimed is:

1. A milk meter for measuring a flow rate of a milk flow, provided with an inlet to which, in use, the milk flow is supplied, an outlet where the milk flow leaves the milk meter, in use, and a liquid flow path extending from the inlet to the outlet, wherein the milk meter is provided with a measuring chamber which is included in the liquid flow path and a float which is in the measuring chamber and is configured to float on milk of the milk flow that is in the measuring chamber, wherein the milk meter is configured such that a level of milk in the measuring chamber depends on the flow rate of the milk flow, wherein in the float an electronic measuring unit is arranged for contactlessly measuring the height within the measuring chamber at which the float is floating on the milk in the measuring chamber so that the measured height is a measure of the flow rate of the milk flow, and wherein the electronic measuring unit is provided with a transmitter unit for wirelessly emitting a signal which comprises information about the measured flow rate of the milk flow.

2. The milk meter according to claim 1, wherein the milk meter is furthermore provided with a magnetic unit for generating a magnetic field in the measuring chamber such that the magnetic field varies in a height direction of the measuring chamber, wherein the electronic measuring unit is configured for measuring the strength of the magnetic field, wherein the measured magnetic field strength of the magnetic field is a measure of the height within the measuring chamber at which the float is floating on the milk in the measuring chamber and whereby hence the measured field strength of the magnetic field is a measure of the flow rate of the milk flow.

3. The milk meter according to claim 2, wherein the electronic measuring unit is furthermore provided with a sensor for detecting the magnetic field and a processor for processing measuring signals of the sensor to obtain information about the flow rate of the milk flow.

4. The milk meter according to claim 1, wherein the electronic measuring unit is provided with a transmitter for emitting up in an upward direction a pulsating electromagnetic or acoustic measuring signal, a receiver for receiving reflections of the measuring signal on a part of the milk meter that is fixed relative to the measuring chamber, and a processor for determining the time difference between the emission and reception of a pulse of the measuring signal, wherein the time difference is a measure of the height within the measuring chamber at which the float is floating on the milk in the measuring chamber and whereby hence the measured time lapse is a measure of the flow rate of the milk flow.

5. The milk meter according to claim 1, wherein the electronic measuring unit is further provided with a supply for providing a supply voltage for the operation of the electronic measuring unit.

6. The milk meter according to claim 1, wherein the measuring chamber is provided with a first outlet opening which is in fluid communication with the outlet so that, in use, milk can flow out of the measuring chamber to the outlet, the outlet opening being preferably provided in a bottom of the measuring chamber.

7. The milk meter according to claim 1, wherein the milk meter is provided with a buffer reservoir which is included upstream of the measuring chamber in the liquid flow path, while in a sidewall of the buffer reservoir an outflow opening is provided which extends from a lowest point of the outflow opening upwardly and which is in fluid communication with the outlet, while a top of the buffer reservoir comprises an inlet opening which is in fluid communication with the inlet, and wherein the buffer reservoir and the measuring chamber are connected with each other via a fluid connection, such that the buffer reservoir, fluid connection and measuring chamber, in use, function as communicating vessels so that, in use, a level of the milk in the measuring chamber is equal to a level of the milk in the buffer reservoir.

8. The milk meter according to claim 7, wherein the buffer reservoir is further provided with a drainage opening which is in fluid communication with the outlet and/or that the measuring chamber is further provided with a drainage opening which is in fluid communication with the outlet.

9. The milk meter according to claim 7, wherein the outflow opening of the buffer reservoir has a width that increases in upward direction.

10. The milk meter according to claim 7, wherein the lowest point of the outflow opening is below a half height of the measuring chamber and preferably at a height higher than a lowest point of the measuring chamber.

11. The milk meter according to claim 7, wherein the outflow opening is in fluid communication with the outlet via a bypass channel.

12. The milk meter according to claim 7, wherein the measuring chamber is of cylinder-shaped design, and with the buffer reservoir extending around the measuring chamber.

13. The milk meter according to claim 10, wherein the bypass channel extends around the measuring chamber and the buffer reservoir extends around the bypass channel.

14. The milk meter according to claim 7, wherein a bottom of the buffer reservoir and a bottom of the fluid connection are at a same height as a bottom of the measuring chamber.

15. The milk meter according to claim 7, wherein the milk meter is provided with a milk flow spread plate which is arranged in the liquid flow path between the inlet and the buffer reservoir and is positioned such that the milk flow is distributed by the plate.

16. The milk meter according to claim 2, wherein the magnetic unit is arranged above the measuring chamber.

17. The milk meter according to claim 15, wherein the magnetic unit is positioned under the spread plate.

18. The milk meter according claim 1, wherein the magnetic unit comprises a permanent magnet.

19. The milk meter according to claim 1, wherein the float is of exchangeable design.

20. The milk meter according to claim 3, wherein the sensor is a Hall sensor.

* * * * *